(12) United States Patent
Willis et al.

(10) Patent No.: US 11,249,010 B2
(45) Date of Patent: Feb. 15, 2022

(54) CARBON FILLED POLYMER STRUCTURE FOR HIGH TEMPERATURE CHEMICAL DETECTOR SYSTEMS AND METHODS

(71) Applicant: FLIR Detection, Inc., Stillwater, OK (US)

(72) Inventors: Chris Willis, Stillwater, OK (US); Craig A. Aker, Stillwater, OK (US)

(73) Assignee: FLIR Detection, Inc., Stillwater, OK (US)

( * ) Notice: Subject to any disclaimer, the term of this patent is extended or adjusted under 35 U.S.C. 154(b) by 0 days.

(21) Appl. No.: 16/802,102

(22) Filed: Feb. 26, 2020

(65) Prior Publication Data

US 2020/0309677 A1    Oct. 1, 2020

Related U.S. Application Data

(60) Provisional application No. 62/825,203, filed on Mar. 28, 2019.

(51) Int. Cl.
| | |
|---|---|
| *G01N 21/09* | (2006.01) |
| *G01N 21/35* | (2014.01) |
| *G01N 21/77* | (2006.01) |
| *G01N 21/65* | (2006.01) |
| *C08L 27/18* | (2006.01) |
| *C08L 45/00* | (2006.01) |
| *C08K 3/04* | (2006.01) |
| *C08L 23/02* | (2006.01) |

(52) U.S. Cl.
CPC ............... *G01N 21/09* (2013.01); *C08K 3/04* (2013.01); *C08L 23/02* (2013.01); *C08L 27/18* (2013.01); *C08L 45/00* (2013.01); *G01N 21/35* (2013.01); *G01N 21/65* (2013.01); *G01N 21/77* (2013.01); *G01N 2021/651* (2013.01); *G01N 2021/7763* (2013.01)

(58) Field of Classification Search
None
See application file for complete search history.

(56) References Cited

U.S. PATENT DOCUMENTS

| | | | |
|---|---|---|---|
| 6,305,213 B1* | 10/2001 | Lagesson | G01N 21/05 356/246 |
| 10,209,231 B2* | 2/2019 | Keen | G01N 33/0057 |
| 2009/0161108 A1* | 6/2009 | Frese | B01L 3/5027 356/440 |
| 2012/0192621 A1* | 8/2012 | Ludwig | G01N 21/0332 73/25.01 |
| 2018/0067088 A1* | 3/2018 | Keen | G01N 31/10 |
| 2020/0025674 A1* | 1/2020 | Gunji | F16J 15/104 |

* cited by examiner

*Primary Examiner* — Shawn Decenzo
(74) *Attorney, Agent, or Firm* — Haynes and Boone, LLP

(57) ABSTRACT

Various techniques are provided to implement, operate, and manufacture a chemical detection device. In one embodiment, a device includes a flow path comprising an analyte reporter configured to receive samples passed by the flow path. The device also includes an excitation source configured generate a response from the analyte reporter. The device also includes a detector configured to receive the response from the analyte reporter to determine whether the samples comprise a material of interest. The device also includes a support structure configured to position the flow path relative to the excitation source and the detector, wherein the support structure comprises a carbon filled polymer material. Additional devices, systems, and methods are also provided.

15 Claims, 8 Drawing Sheets

CARBON FILLED POLYMER STRUCTURE FOR HIGH TEMPERATURE CHEMICAL DETECTOR SYSTEMS AND METHODS

CROSS REFERENCE TO RELATED APPLICATIONS

This application claims the benefit of and priority to U.S. Provisional Patent Application No. 62/825,203 filed Mar. 28, 2019 and entitled "CARBON FILLED POLYMER STRUCTURE FOR HIGH TEMPERATURE CHEMICAL DETECTOR SYSTEMS AND METHODS," which is incorporated herein by reference in its entirety

TECHNICAL FIELD

The present invention relates generally to chemical detection and, more particularly, to systems and methods for detecting trace materials of interest.

BACKGROUND

In the field of chemical detection, chemical reporters may be utilized that exhibit certain responses when they interact with particular materials of interest. For example, chemical reporters may exhibit fluorescence, non-fluorescence, changes in resistance, and/or other responses when materials of interest are present.

The chemical reporters may be provided as part of a chemical detector that includes various additional components including, for example, a flow path, excitation sources, detectors, and/or other features. One or more physical support structures may also be provided to position these various components relative to each other.

In some cases, materials of interest may be heated to provide vaporized samples for analysis. However, certain structural materials (e.g., many plastics and acetal resins such as black Delrin™) may not be sufficiently heat resistant to reliably maintain a desired physical arrangement under operating conditions. Thus, the particular material used to implement support structures of a chemical detector can significantly impact its performance and reliability. Moreover, many conventional heat resistant plastics are inherently fluorescent under normal operating conditions and may therefore interfere with detection of the fluorescence (or non-fluorescence) of various chemical reporters.

SUMMARY

In one embodiment, a device includes a flow path comprising an analyte reporter configured to receive samples passed by the flow path; a detector configured to receive a response from the analyte reporter to determine whether the samples comprise a material of interest; and a support structure configured to position the flow path relative to the detector, wherein the support structure comprises a carbon filled polymer material.

In another embodiment, a method includes positioning, by a support structure, a flow path relative to an excitation source and a detector, wherein the support structure comprises a carbon filled polymer material; receiving samples in the flow path; passing the samples through the flow path to an analyte reporter disposed in the flow path; and receiving, at the detector, a response from the analyte reporter to determine whether the samples comprise a material of interest.

In another embodiment, a method includes providing a support structure comprising a carbon filled polymer material; inserting a flow path into a cavity defined by the support structure, wherein the flow path comprises an analyte reporter configured to receive samples passed by the flow path; positioning, by the support structure, the flow path relative to a detector; and wherein the detector is configured to receive a response from the analyte reporter to determine whether the samples comprise a material of interest.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
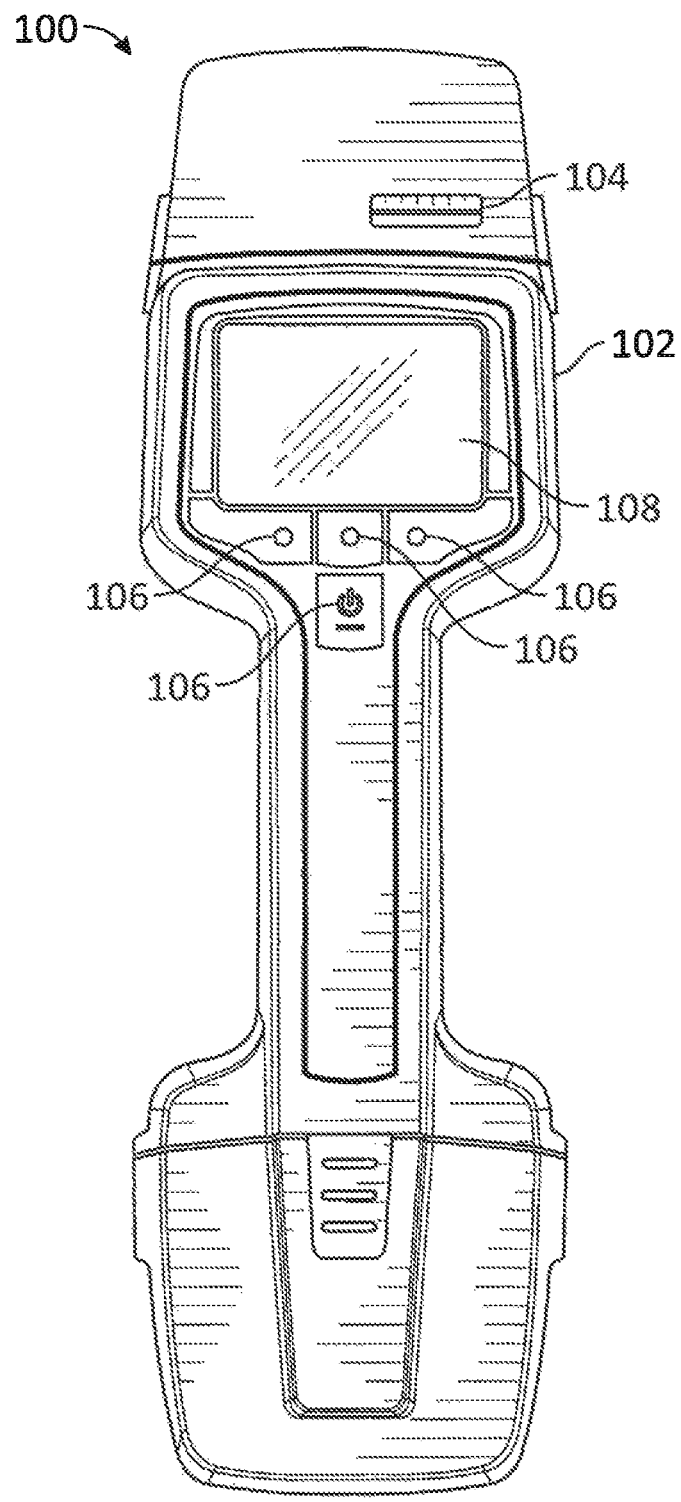
FIG. 1 illustrates an external view of a trace material detection device in accordance with an embodiment of the disclosure.

In accordance with various embodiments disclosed herein, a trace materials detection device may be implemented with a chemical detector including a support structure (e.g., also referred to as a core or a core structure) comprising a carbon filled polymer material (e.g., polymer material mixed with carbon). In some embodiments, such material may exhibit sufficient heat resistance to prevent deformation of the support structure in the presence of one or more heaters used to heat samples at high temperatures for analysis. In some embodiments, such material may also exhibit little to no fluorescence during chemical detection operations. Also in some embodiments, such material may be rigid, non-conductive, and opaque, all of which permit the material to be used reliably in a chemical detector under high temperature operating conditions. In some embodiments, the support structure may be implemented using carbon filled polytetrafluoroethylene (PTFE), carbon filled cyclic olefin copolymer (COC), carbon filled cyclic olefin polymer (COP), and/or other materials as appropriate. For example, in some embodiments, carbon filled Topas™ or carbon filled Zeonor™ may be used.

In various embodiments, the chemical detector may be implemented with one or more chemical reporters (e.g., also referred to as analyte reporters) configured to exhibit various responses including, for example, a fluorescent response, a change in fluorescence, a luminescent response, a change in luminescence, an infrared/Raman response, a change in resistivity, and/or other responses when materials of interest are present. Thus, it will be appreciated that chemical detectors may be used with appropriate detectors to detect chemicals, and that the chemical reporters themselves are not required to exhibit chemical reactions in all embodiments (e.g., non-chemical reactions by chemical reporters are contemplated in some embodiments). In some embodiments, such responses may be the result of a change in the chemical reporter that may be detected at a particular type of detector of the chemical detector, which signals the presence of a material of interest. For example, in some embodiments, the change may be a change in fluorescence of the chemical reporter that is detected by an optical detector. In some embodiments, the change may be a change in resistivity of the chemical reporter that is detected by an appropriate electrical detector. In some embodiments, the change may be an infrared/Raman response that is detected by an appropriate infrared/Raman response detector. In this way, materials of interest are identified in a convenient, low cost, rapid, and highly portable manner.

In some embodiments, one or more chemical reporters may be configured to respond to a wide range of materials including, but not limited to, pentaerythritol tetranitrate (PETN), ethylene glycol dinitrate (EGDN), nitroglycerin, nitroglycerin containing powders such as double-based and triple-based smokeless powders, cyclotrimethylenetrinitramine (RDX), 2,4,6-trinitrotoluene (TNT), and/or peroxide-based explosives (e.g., triacetone triperoxide (TATP)). Additional materials of interest are also contemplated.

Turning now to the drawings, FIG. 1 illustrates an external view of a trace material detection device 100 in accordance with an embodiment of the disclosure. For example, in some embodiments, device 100 may be implemented as a handheld portable detector capable of detecting explosives and/or other materials.

As shown, device 100 includes a housing 102, a slot 104, user controls 106, and a display 108. In various embodiments, additional components of device 100 (e.g., further illustrated in FIG. 2) may be distributed at physical locations internal to and/or external to housing 102.

In operation, sampling media may be brought into physical contact with one or more surfaces to be tested. For example, in some embodiments, a user may wipe the media (e.g., also referred to as a "sampling swab") against a surface of interest to collect trace amounts of one or more test substances resident on the surface. The user then inserts the media into slot 104 after which additional operations and analysis are performed as further discussed herein. In some embodiments, the media may be implemented using an appropriate substrate such as polytetrafluoroethylene (PTFE), an aramid polymer, polyethylene, polyester, paper, and/or other materials.

In some embodiments, use of the media may not be necessary, as an inlet may be used to directly sample ambient air for vapor-phase analytes. Additional devices may be used to direct the analytes into the inlet, such as an air filter/concentrator positioned in the flow path of the analytes.

User controls 106 receive user input to operate device 100. As shown in FIG. 1, user controls 106 may be implemented as physical buttons. In other embodiments, user controls 106 may be implemented by one or more keyboards, levers, joysticks, touchscreens, and/or other controls. In some embodiments, user controls 150 may be integrated with display 108 as a touchscreen.

Display 108 presents information to the user of device 100. For example, FIG. 1 illustrates a warning message provided on display 108 in response to a detected material. In various embodiments, display may be implemented as a liquid crystal display (LCD), an organic light emitting diode (OLED) display, and/or any other appropriate display.

Figure 2:
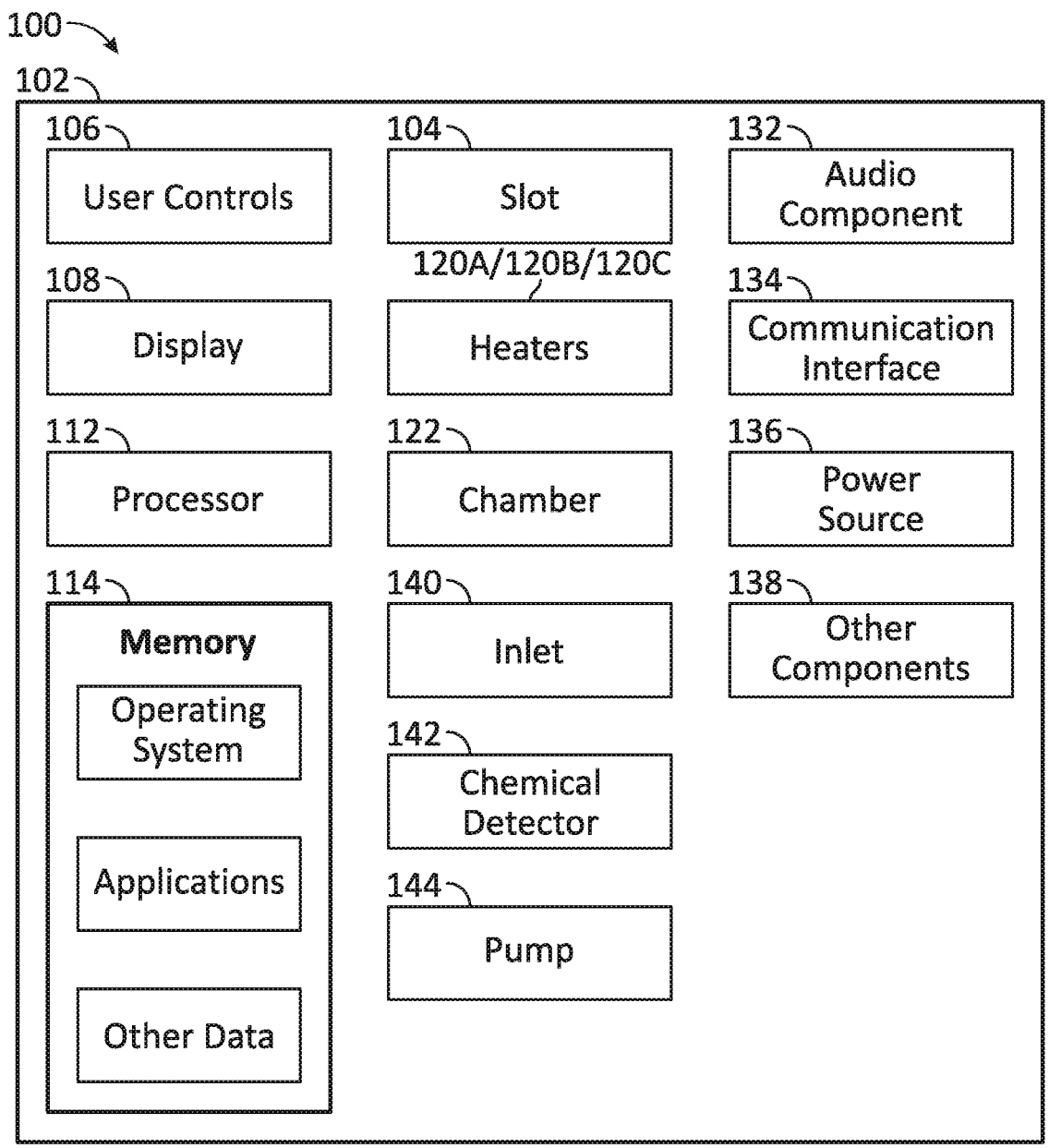
FIG. 2 illustrates a block diagram of a trace material detection device in accordance with an embodiment of the disclosure.

Additional features of device 100 are further illustrated in FIG. 2. FIG. 2 illustrates a block diagram of device 100 in accordance with an embodiment of the disclosure. In addition to several previously discussed components shown in FIG. 1, FIG. 2 further illustrates a processor 112, a memory 114, heaters 120A/120B/120C, a chamber 122, an audio component 132, a communication interface 134, a power source 136, an inlet 140, a chemical detector 142, a pump 144, and other components 138.

Processor 112 may be implemented as one or more microprocessors, microcontrollers, system on a chip (SoC), application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of device 100. In this regard, processor 112 may execute machine readable instructions (e.g., software, firmware, or other instructions) stored in memory 114.

Memory 114 may be implemented as a machine readable medium storing various machine readable instructions and data. For example, in some embodiments, memory 114 may store an operating system 115 and one or more applications 116 as machine readable instructions that may be read and executed by processor 112 to perform various operations described herein. Memory 114 may also store various types of data 117 including, for example, chemical profiles, test sample identification results, and/or other information used or provided by the various components of device 100. In various embodiments, memory 114 may be implemented to store such instructions and data in a non-transitory manner and/or may be implemented with both transitory and non-transitory portions to selectively store all or portions of such instructions and data in either manner as appropriate.

Media heater 120A may be used to heat test samples (e.g., provided on a sampling swab) to a desired temperature such that the test samples at least partially vaporize to provide analytes for chemical detection. Inlet heater 120B may be used to maintain analytes received through inlet 140 in a vaporized state. Reporter heater 120C may be used to heat a flow path as further discussed herein. In some embodiments, one or more of heaters 120A, 120B, and/or 120C may be resistive heaters configured to heat the test samples, however other configurations may be used in other embodiments.

Chamber 122 provides a recessed volume within housing 102 and receives the media inserted through slot 104. While disposed in chamber 122, the media may be heated by media heater 120A.

Audio component 132 may be implemented, for example, as a speaker or other transducer with corresponding driver circuitry to provide audible sounds to a user of device 100. For example, in some embodiments, audio component 132 may provide audible signals in response to manipulation of user controls 106 and/or in response to the operations of processor 112 (e.g., to indicate that a particular material is present or is not present).

Communication interface 134 may be implemented as a wired and/or wireless interface connect device 100 (e.g., by Universal Serial Bus (USB), Ethernet, WiFi, Bluetooth, cellular, infrared, radio, and/or other protocols) with various external devices to update operating system 115, update applications 116, and/or communicate data 117. In some embodiments, communication interface 134 may connect to external power sources (e.g., a power outlet) to charge a battery of power source 136 and/or to directly power device 100.

Power source 136 may be implemented, for example, as a battery to permit mobile and remote use of device 100, a solar power source, a fuel cell, or wall power. In some embodiments, power source 136 may be a removable battery. Other components 138 may also be provided as appropriate for various types of devices 100 to support, for example, application specific operations of such devices.

Inlet 140, chemical detector 142, and pump 144 (e.g., implemented as an emission-based detector and/or using other technologies) may be used with heaters 120A/120B/120C to provide a swab-based thermal desorber to perform vapor-based material detection as further discussed herein. In some embodiments, inlet 140 can directly sample ambient air for vapor-phase analytes without the need for the swab-based thermal desorber. For example, air from the ambient environment may be directly drawn into inlet 140.

Figure 3:
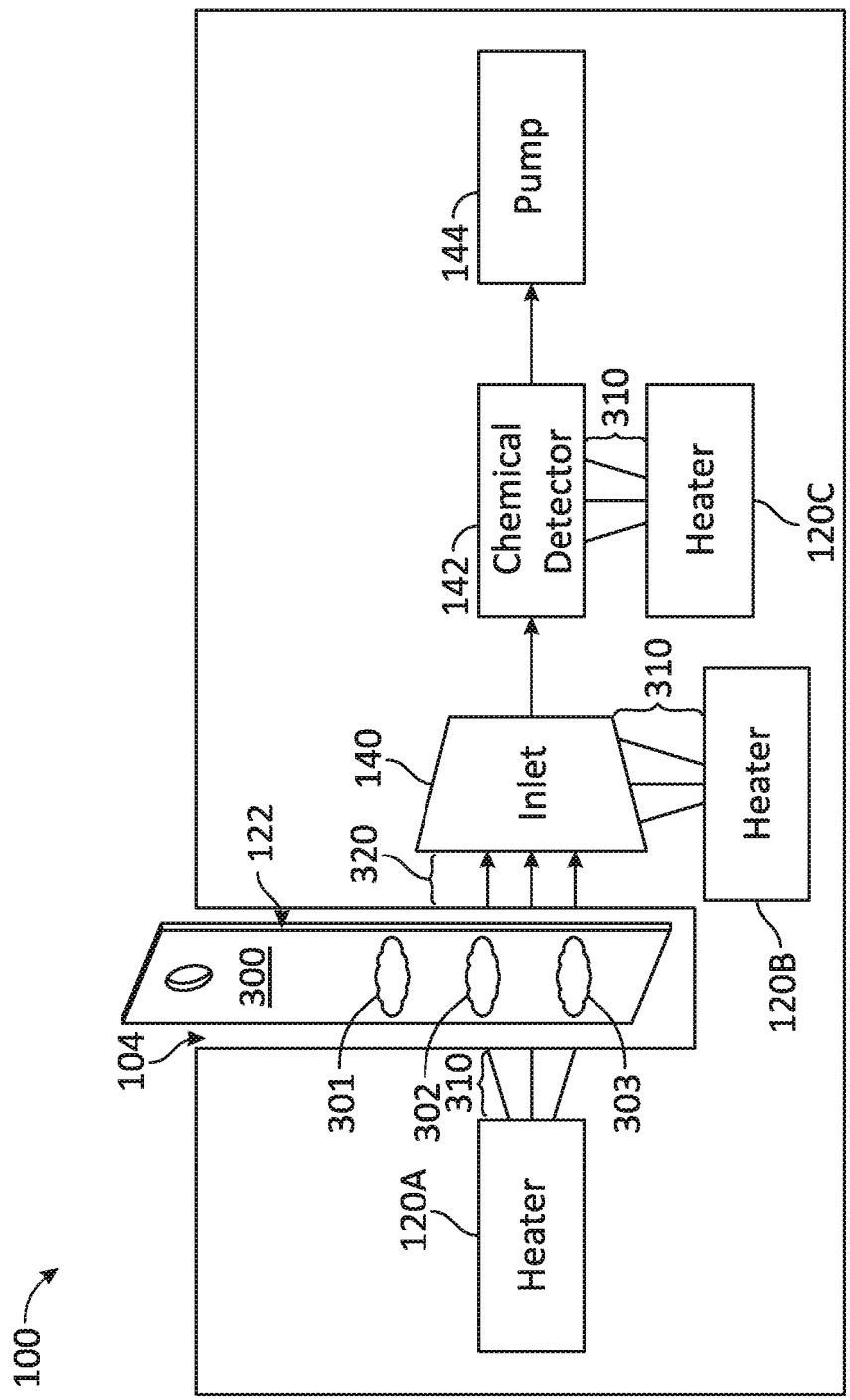
FIG. 3 illustrates an operational flow of analytes through a trace material detection device in accordance with an embodiment of the disclosure.

FIG. 3 illustrates an operational flow of analytes through device 100 in accordance with an embodiment of the disclosure. As shown, media 300 has been inserted through slot 104 in housing 102 and is positioned in chamber 122. Media 300 includes test samples 301, 302, and 303 which correspond to three different materials under test that have been picked up by the user's application of media 300 against one or more surfaces of interest.

Heater 120A operates (e.g., in response to control signals provided by processor 112) to apply heat 310 to media 300 and samples 301, 302, and 303 to raise their temperatures to a desired desorption temperature. In some embodiments, one or more of heaters 120A, 120B, and/or 120C may operate in the range of approximately 90 degrees C. to approximately 160 degrees C., however higher or lower temperatures may be used as desired. For example, in some embodiments, even higher temperature ranges are contemplated such a range of approximately 90 degrees C. to approximately 190 degrees C., or a range of approximately 145 degrees C. to approximately 190 degrees C.

In some embodiments, one or more of heaters 120A and 120B may be implemented to contact media 300. For example, heaters 120A and/or 120B may be mechanically moved to place the heaters 120A and 120B in contact with or in close proximity to media 300. In other embodiments, heaters 120A and/or 120B may be fixed in position.

In some embodiments, test samples 301, 302, and 303 may be materials that partially or completely vaporize in response to heat 310 applied by heater 120A to provide analytes 320 (e.g., corresponding to vaporized portions of test samples 301, 302, and 303). The vaporized materials may exhibit various vapor pressures that facilitate the ability of pump 144 and chemical detector 142 to appropriately receive the analytes 320 (e.g., RDX has a vapor pressure of $5 \times 10^{-7}$ Torr at 20 degrees C., TNT has a vapor pressure of $2 \times 10^{-5}$ Torr at 20 degrees C., glycerol has a vapor pressure of $2.5 \times 10^{-3}$ Torr at 50 degrees C., and ethanol has a vapor pressure of 45 Torr at 20 degrees C.). Pump 144 operates to draw analytes 320 in and through inlet 140 into chemical detector 142. Based on interactions between analytes 320 and chemical detector 142 (e.g., performing trace detection), the presence of certain materials of interest may be determined.

Figure 4:
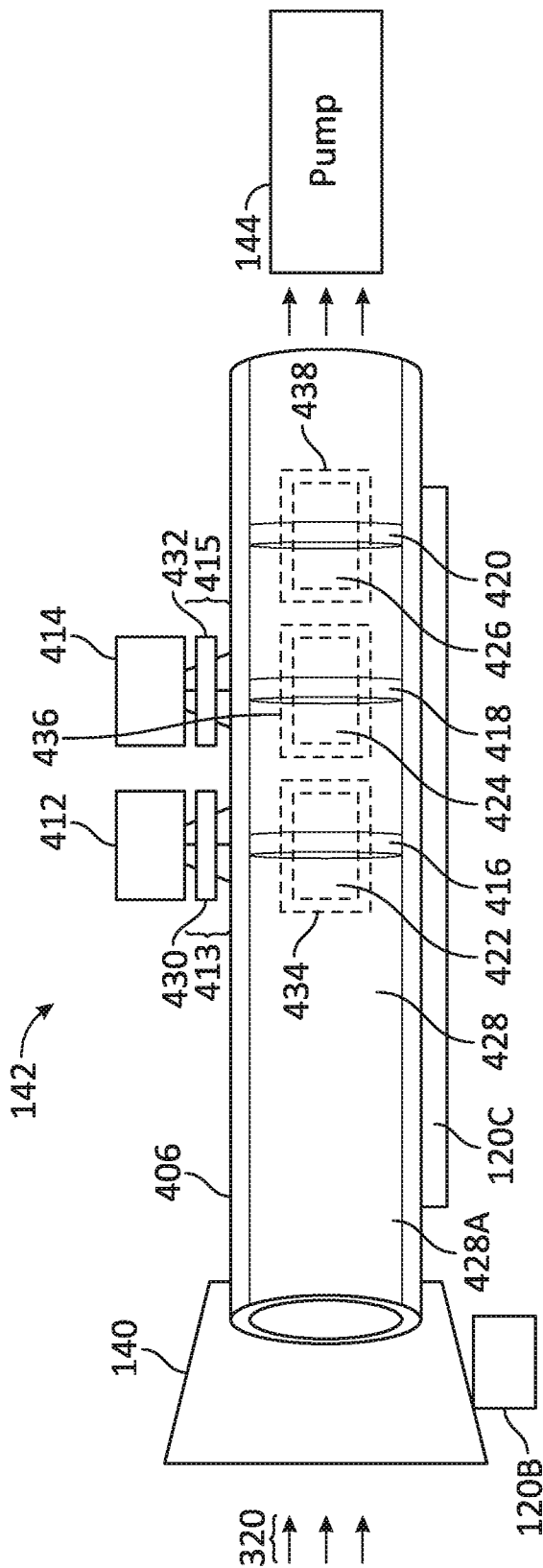
FIG. 4 illustrates a partial cross section view of a chemical detector of a trace materials detection device in accordance with an embodiment of the disclosure.
Figure 5:
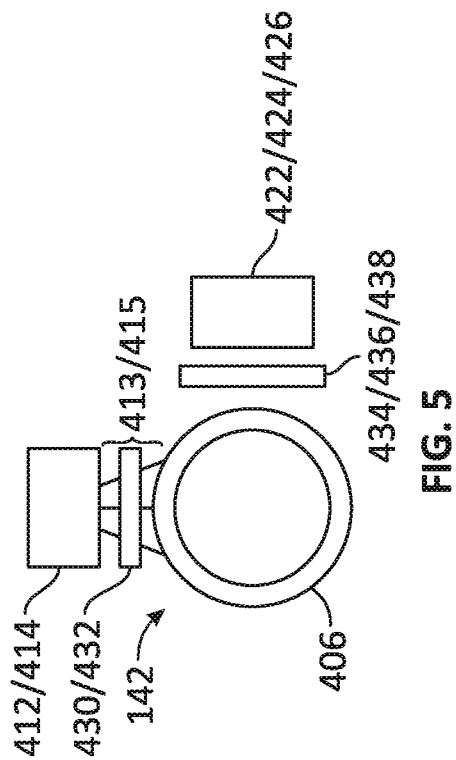
FIG. 5 illustrates a front view of a chemical detector of a trace materials detection device in accordance with an embodiment of the disclosure.

FIGS. 4 and 5 illustrate various views of chemical detector 142 of device 100 in accordance with embodiments of the disclosure. As shown, detector 142 includes an inlet 140, a tip heater 120B, a flow path 406 (e.g., implemented as a capillary tube in the particular illustrated embodiments), a sensing channel 428 (e.g., implemented as a cavity within a capillary tube in these particular illustrated embodiments), a reporter heater 120C, various chemical reporters 416, 418, and 420, excitation sources 412 and 414 associated with chemical reporters 416 and 418, and response detectors 422, 424, and 426 associated with chemical reporters 416, 418, and 420.

In FIGS. 4 and 5, excitation sources 412 and 414 are illustrated as illumination sources (e.g., optical excitation sources such as light emitting diodes (LEDs) and/or others as appropriate). In this case, corresponding optical filters 430 and 432 may be provided to selectively filter the illumination provided by excitation sources 412 and 414 to desired wavelengths. Other types of excitation sources are also contemplated including, for example, electrical excitation sources (e.g., voltage sources, current sources, electric power supplies, and/or others as appropriate), chemical excitation sources, and/or others as appropriate.

Also in FIGS. 4 and 5, detectors 422, 424, and 426 are illustrated as optical detectors (e.g., photodiodes and/or other appropriate detectors). In this case, corresponding optical filters 434, 436, and 438 may be provided to selectively filter the optical responses provided by chemical reporters 416, 418, and 420 to desired wavelengths. Other types of detectors are also contemplated including, for example, electrical response detectors (e.g., detecting changes in resistance, current, voltage, and/or other properties), chemical response detectors, and/or others as appropriate.

As shown, when implemented as a capillary tube, flow path 406 defines sensing channel 428 through which vapor-phase analytes 320 pass through and interact with chemical reporters 416, 418, and 420. Analytes 320 pass through inlet 140, where analytes 320 may be heated by tip heater 120B. Tip heater 120B maintains inlet 140 at a temperature sufficient to keep analytes 320 in the vapor-phase. More specifically, tip heater 120B prevents loss of analytes 320 while traveling through inlet 140 toward chemical reporters 416, 418, and 420. Pump 144 continues to pull the air with analytes 320 in through inlet 140 and provides the ability to move vapor-phase analytes 320 from inlet 140 through sensing channel 428 to chemical detectors 416, 418, and 420. Reporter heater 120C heats flow path 406 to reduce the formation of "cold spots" where analytes 320 can lump together. In addition, reporter heater 120C helps analytes 320 desorb from chemical reporters 416, 418, and 420 to improve subsequent detection of analytes. In some embodiments, sensing channel 428 includes an initial portion 428A to prevent overheating of chemical reporters 416, 418, and 420 due to their proximity to tip heater 120B.

In some embodiments, an acid catalyst may be provided within sensing channel 428 to facilitate additional chemical reactions and associated detection as set forth in U.S. Pat. No. 10,209,231 which is incorporated by reference herein in its entirety.

Analytes 320 move over each of the chemical reporters 416, 418, and 420. In some embodiments, chemical reporters 416, 418, and 420 may be placed in any order. In addition, although illustrated as discrete sections in FIGS. 4 and 6, chemical reporters 416, 418, and 420 may contact each other and/or may be layered over each other in some embodiments. In some embodiments, chemical reporters 416, 418, and 420 may be provided as coatings disposed on an interior surface of flow path 406. However, other implementations are also contemplated.

In some embodiments, chemical reporter 416 is operable to detect certain military explosives and may be termed a "military explosives chemical reporter." In some embodiments, military explosives chemical reporter 416 includes an amplifying fluorescent polymer or other military chemical reporter. The intensity of light emitted by the amplifying fluorescent polymer varies in response to interaction of the amplifying fluorescent polymer with analytes 320.

For example, the binding of one analyte molecule to the amplifying fluorescent polymer quenches the emission of many polymer repeat units. Thus, when an analyte of interest lands on a polymer binding site, many polymer repeat units in the vicinity of the bound analyte do not emit absorbed light as fluorescence. As a result, the polymer fluorescence is said to be "quenched" by the adsorption of the analyte molecule.

In some embodiments, military explosives chemical reporter 416 is associated with illumination source 412 having an associated wavelength and response detector 422 (e.g., an optical detector). Illumination source 412 (e.g., a LED) emits light 413 in a wavelength that interacts with the amplifying fluorescent polymer to cause the amplifying fluorescent polymer to generate an emission. In some embodiments, the wavelength is about 400 nm (e.g., 365 nm). In some embodiments, illumination source 412 only illuminates the portion of military explosives chemical reporter 416 that contains the amplifying fluorescent polymer. Response detector 422 (e.g., a photodiode) is positioned to receive the emission generated by the amplifying fluorescent polymer to detect the presence of one or more analytes 320. As shown in FIG. 5, in some embodiments, illumination source 412 and response detector 422 are positioned to be out of line of sight, for example 90 degrees apart. This ensures that light emitted by illumination source 412 is not captured by response detector 422, so that response detector 422 captures mostly the emission generated by the amplifying fluorescent polymer. Other dispositions of illumination source 412 and response detector 422 are contemplated, and illumination source 412 and response detector 422 can be positioned in any desired configuration (e.g., in close proximity or co-located in some embodiments). Inlet 140 is not shown in FIG. 5 for purposes of clarity.

Examples of analytes that are detectable by military explosives chemical reporter 416 are TNT and nitroglycerin.

Other substances that may be detected are disclosed in U.S. Pat. No. 6,558,626, which is incorporated by reference herein in its entirety.

In some embodiments, chemical reporter 418 is operable to detect certain nitrogen-based explosives, such as nitric acid precursors like nitroglycerin, and may be termed a "nitric acid chemical reporter." In some embodiments, nitric acid chemical reporter 418 includes a fluorescent compound that is pH sensitive (e.g., acid sensitive). In some embodiments, a fluorescent compound such as 2-[5-methoxy-2-(4-phenyl-quinoline-2yl)-phenyl]-ethanol may be used. Other suitable fluorescent compounds are disclosed in U.S. Pat. No. 9,068,960, which is incorporated by reference herein in its entirety. Increases or decreases in the response of the fluorescent compound of the nitric acid chemical reporter 418 to light establish the presence of nitric acid (and a nitric acid precursor). For example, upon reaction of nitric acid with the fluorescent compound of the nitric acid chemical reporter 418, the fluorescent compound will undergo a change in fluorescent response intensity.

Nitric acid chemical reporter 418 is associated with illumination source 414 having an associated wavelength (e.g., 365 nm) and response detector 424 (e.g., an optical detector). Illumination source 414 (e.g., a LED) emits light 415 in a wavelength that interacts with the fluorescent compound of the nitric acid chemical reporter 418 to cause the fluorescent compound to generate an emission. Response detector 424 is positioned to receive the emission generated by the fluorescent compound of the nitric acid chemical reporter 418 to detect the presence of nitric acid. Response detector 424 detects the changes in response of the fluorescent compound of the nitric acid chemical reporter 418 to thereby establish the presence of a nitric acid precursor. Illumination source 414 and response detector 424 may be positioned out of line of sight as shown in FIG. 5.

In some embodiments, an initial response baseline may be first established for the fluorescent compound of the nitric acid chemical reporter 418. To establish the baseline response for the fluorescent compound of the nitric acid chemical reporter 418, a user activates illumination source 414 and heaters 120A, 120B, and 120C, allowing each to achieve operational conditions. Then the user presents flow path 406 (implemented as a capillary tube in the illustrated embodiments), free of analytes 320, to illumination source 414 and response detector 424 to produce a detectable response from the fluorescent compound of the nitric acid chemical reporter 418. Thus, any response resulting from this process is free of influence from nitric acid, and can be used to detect whether a change in response occurs.

In some embodiments, chemical reporter 420 is operable to detect certain peroxide-based explosives, such as peroxide precursors like TATP (e.g., test sample 303), and may be termed a "peroxide chemical reporter." In some embodiments, peroxide chemical reporter 420 includes a light-emitting peroxide-reactive compound and is associated with response detector 426 (e.g., an optical detector). Light-emitting materials suitable for use may be any luminescent material, including dyes, oligomers, polymers, and combinations thereof. The light-emitting material may be selected to exhibit certain properties, such as a particular emission wavelength, high quantum yield, high output light efficiency when formulated in a peroxide reactive system, and/or compatibility (e.g., solubility) with one or more components of the system. Additional details regarding the light-emitting materials are found in U.S. Pat. No. 9,005,524, which is incorporated by reference herein in its entirety.

The light-emitting peroxide-reactive material responds to the hydrogen peroxide generated from peroxide precursors to produce energy in the form of the emission of a photon. In some embodiments, the resulting energy can stimulate luminescence of the light-emitting peroxide-reactive material such that light energy is emitted. The resulting emission may be detected by response detector 426, which signals the presence of hydrogen peroxide (and a peroxide precursor). Accordingly, in some embodiments, chemical reporter 420 may be implemented without a corresponding excitation source.

Figure 6:
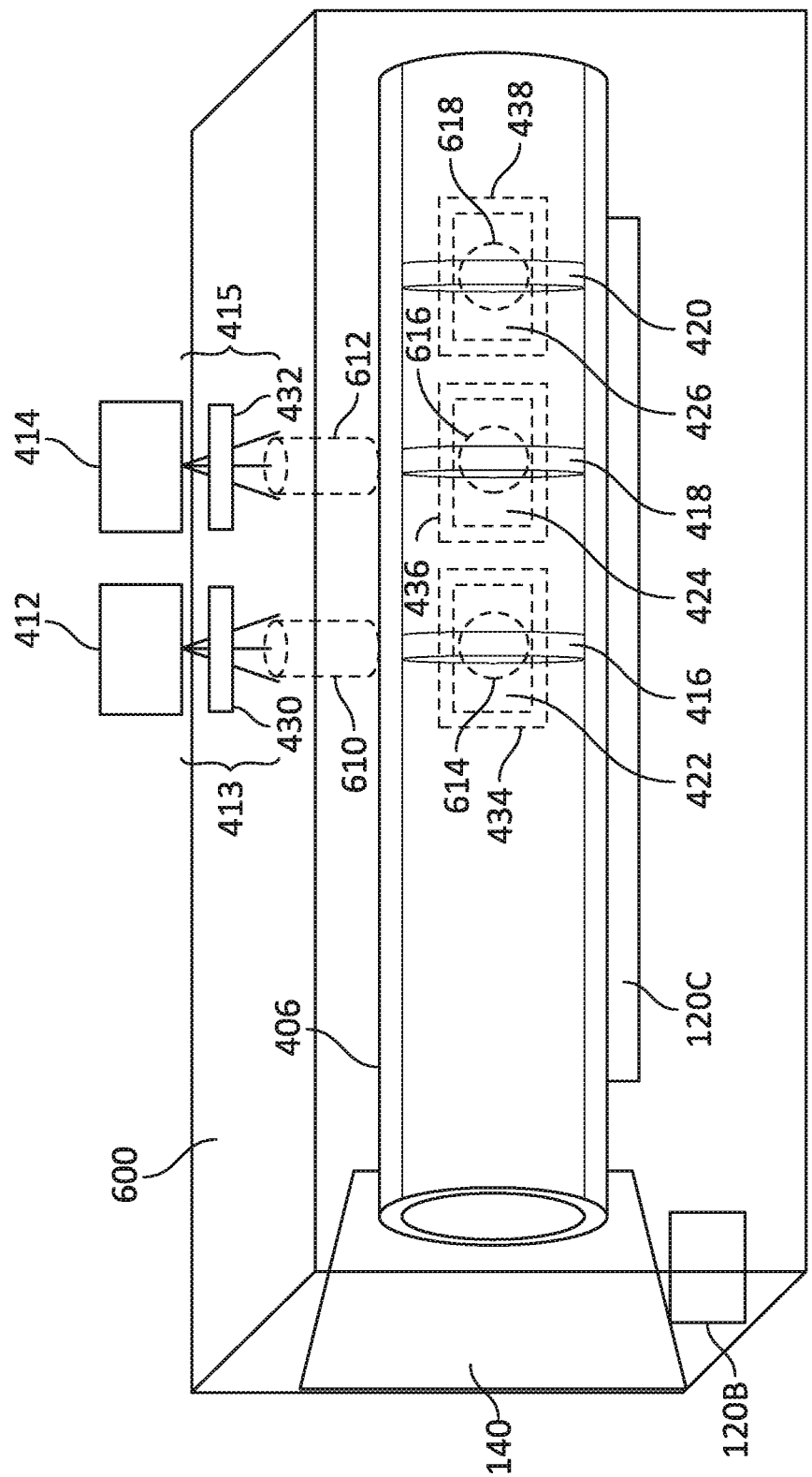
FIG. 6 illustrates a partial cross section view of a chemical detector of a trace materials detection device implemented with a support structure in accordance with an embodiment of the disclosure.
Figure 7:
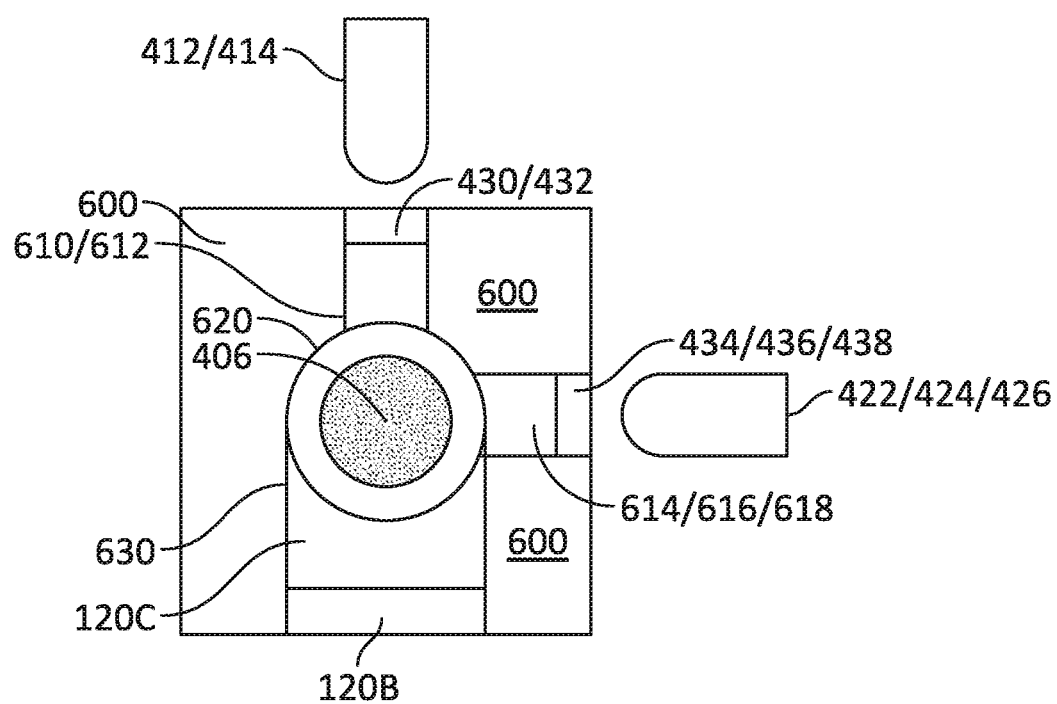
FIG. 7 illustrates a front view of a chemical detector of a trace materials detection device implemented with a support structure in accordance with an embodiment of the disclosure.

FIG. 6 illustrates a partial cross section view of chemical detector 142 implemented with a support structure 600 and FIG. 7 illustrates a front view of chemical detector 142 implemented with support structure 600 in accordance with embodiments of the disclosure.

As discussed, chemical detector 142 may be implemented with a support structure 600 (e.g., also referred to as a core or a core structure) comprising a carbon filled polymer material. In some embodiments, the carbon filled polymer material of support structure 600 exhibits sufficient heat resistance to prevent deformation of support structure 600 in the presence of one or more heaters 120A, 120B, and/or 120C. Also, in some embodiments, the carbon filled polymer material of support structure 600 may also exhibit little to no fluorescence during chemical detection operations. In some embodiments, the support structure may be implemented using carbon filled polytetrafluoroethylene (PTFE), carbon filled cyclic olefin copolymer (COC), carbon filled cyclic olefin polymer (COP), and/or other materials as appropriate.

As shown, support structure 600 may receive various components of chemical detector 142 and/or additional components of device 100. Support structure 600 may secure such components (e.g., through friction fit, adhesives, and/or other techniques) relative to each other to maintain their alignment and positions for use during operation. Although support structure 600 is illustrated and discussed with regard to particular apertures and cavities used to receive and secure various components, greater or fewer numbers of apertures and/or cavities may be provided as appropriate for particular implementations.

Support structure 600 may include a cavity 620 configured to receive and secure flow path 406. Support structure 600 may also include apertures 610 and 612 adjoining cavity 620 and extending to the exterior of support structure 600. For example, apertures 610 and 612 may pass excitations (e.g., light 413 and 415 in the case of certain illumination excitations) from excitation sources 412 and 414 through to cavity 620 where they are received by chemical detectors 416 and 418 within flow path 406. Apertures 610 and 612 may also receive and secure optical filters 430 and 432.

Support structure 600 may also include apertures 614, 616, and 618 adjoining cavity 620 and extending to the exterior of support structure 600. For example, apertures 614, 616, and 618 may pass responses (e.g., fluorescence and/or other responses) from chemical detectors 416, 418, and 420 of flow path 406 through to detectors 422, 424, and 426. Apertures 422, 424, and 426 may also receive and secure optical filters 434, 436, and 438.

As discussed, certain structural materials may exhibit fluorescence under operating conditions that may interfere with detection of fluorescence (or non-fluorescence), such as that exhibited by chemical reporters 416, 418, and 420 in some embodiments. By implementing support structure 600 with a carbon filled polymer material such as polytetrafluoroethylene (PTFE), carbon filled cyclic olefin copolymer (COC), carbon filled cyclic olefin polymer (COP), and/or others where appropriate, support structure 600 will not fluoresce and thus will not interfere with such responses from chemical reporters 416, 418, and 420. Moreover, because of this non-fluorescent property, apertures 610, 612, 614, 616, and 618 may be provided directly, by support structure 600 itself, rather than requiring additional shielding or coating of the apertures to block possible fluorescence associated with conventional support structures.

Support structure 600 may also include cavity 630 adjoining cavity 620 and extending to the exterior of support structure 600. For example, cavity 630 may receive and secure heater 120B (e.g., a heating element) and/or heater 120C (e.g., an aluminum heater). In this regard, support structure 600 may maintain the position of tip heater 120B near inlet 140 and the front of flow path 406 to maintain inlet 140 at a temperature sufficient to keep analytes 320 in the vapor-phase as discussed. In addition, support structure 600 may maintain the position of reporter heater 120C along flow path 406 to reduce the formation of cold spots where analytes 320 can lump together and help analytes 320 desorb from chemical reporters 416, 418, and 420 as discussed.

As also discussed, one or more of heaters 120A, 120B, and/or 120C may operate at relatively high temperatures in order to vaporize analytes 320 and maintain appropriate vapor temperatures (e.g., in the range of approximately 90 degrees C. to approximately 190 degrees C., or in the range of approximately 145 degrees C. to approximately 190 degrees C.). In this regard, many conventional materials that might otherwise be used for support structure 600 (e.g., conventional polymer materials) typically cannot withstand such temperatures reliably and are generally subject to deformation, melting, and/or other failures. By implementing support structure 600 with a carbon filled polymer material such as polytetrafluoroethylene (PTFE), carbon filled cyclic olefin copolymer (COC), carbon filled cyclic olefin polymer (COP), and/or others where appropriate, support structure 600 will continue to maintain its shape (e.g., remain entirely in solid form and not deform), even while heaters 120B and 120C are operating and positioned adjacent to and/or received within support structure 600.

Figure 8:
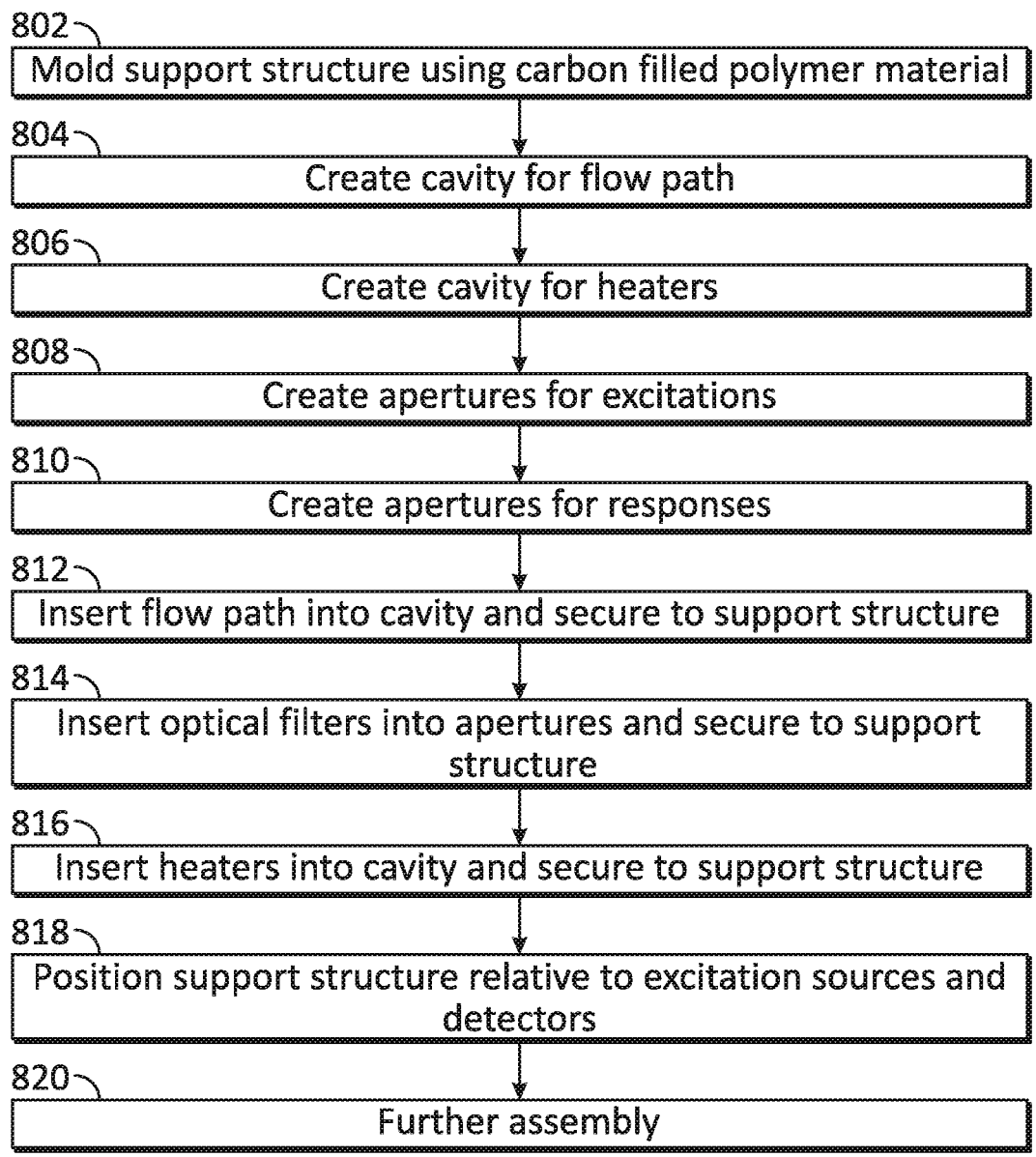
FIG. 8 illustrates a process of manufacturing a chemical detector of a trace materials detection device in accordance with an embodiment of the disclosure.

FIG. 8 illustrates a process of manufacturing chemical detector 142 including support structure 600 in accordance with an embodiment of the disclosure. In block 802, support structure 600 is molded from a carbon filled polymer material. In some embodiments, support structure 600 may be implemented as a single molded structure (e.g., one piece in a unibody construction) with cavities 620 and 630, and apertures 610, 612, 614, 616, and 618 formed at the time of molding in block 802. In other embodiments, support structure 600 may be initially molded into a preliminary structure (e.g., a solid block or other shape) in block 802. The preliminary structure may then be further bored, cut, and/or otherwise worked in blocks 804, 806, 808, and 810 to create cavity 620, cavity 830, and apertures 610, 612, 614, 616, and 618 to form support structure 600.

In block 812, flow path 406 is inserted into cavity 620 and secured therein to support structure 600. In block 814, optical filters 412/414 and 434/436/438 are inserted into apertures 610/612 and 614/616/618 and secured therein to support structure 600. In block 816, heaters 120B/120C are inserted into cavity 630 and secured therein to support structure 600. In various embodiments, the various components inserted in blocks 812, 814, and 816 may be partially or fully inserted into the various cavities and apertures as appropriate for particular implementations.

In block 818, support structure 600 is positioned relative to excitation sources 412/414 and detectors 422/424/426. In this regard, it will be appreciated that the positions of flow path 406, optical filters 412/414 and 434/436/438, and heaters 120B/120C may be fixed through the previous inserting and securing operations of blocks 812/814/816. Thus, by positioning support structure 600 in block 818 (e.g., by aligning apertures 610/612 to excitation sources 412 and aligning apertures 614/616/618 to detectors 422/424/426), chemical detector 142 may be effectively assembled and properly aligned for reliable operation.

In block 820, additional components of chemical detector 142 may be further assembled, and the resulting assembly may be provided for implementation as part of a complete device 100.

Figure 9:
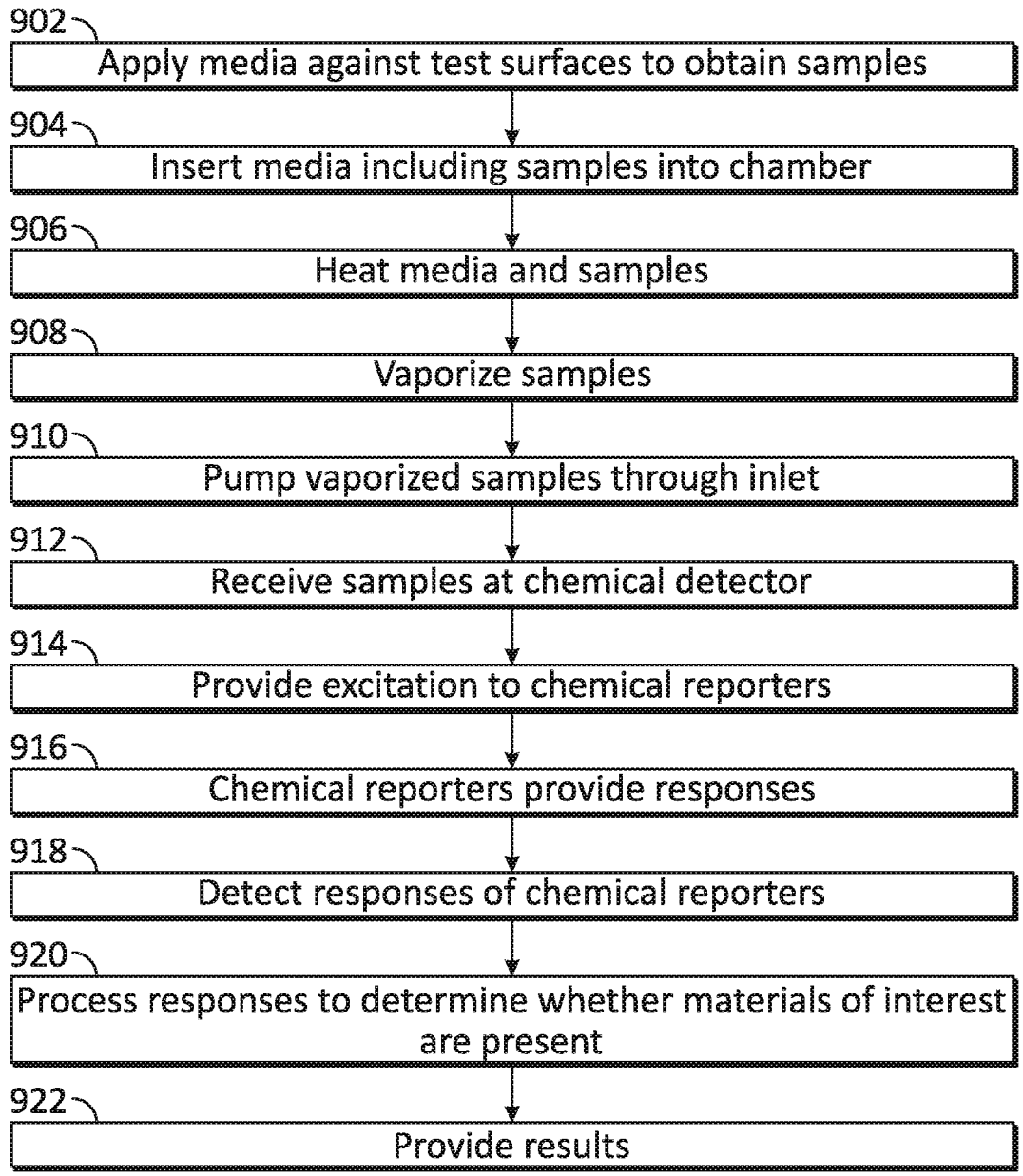
FIG. 9 illustrates a process of operating a trace material detection device in accordance with an embodiment of the disclosure.

FIG. 9 illustrates a process of operating device 100 in accordance with an embodiment of the disclosure. In block 902, a user applies media 300 against a test surface (e.g., a package, luggage, clothing, or other article) to obtain one or more test samples (e.g., test samples 301, 302, and 303 as shown in FIG. 3) corresponding to trace materials residing on the test surfaces.

In block 904, the user inserts media 300 through slot 104 and into chamber 122 as shown in FIG. 3. In block 906, media heater 120A applies heat 310 to media 300 and test samples 301, 302, and 303. In various embodiments, processor 112 may operate media heater 120A in response to the user's operation of one or more user controls 106 and/or automatically in response to the insertion of media 300 into chamber 122.

In block 906, test samples 301, 302, and 303 are at least partially vaporized to provide analytes 320 in response to heat 310 applied by media heater 120A. In some embodiments, heat may applied to both sides of media 300.

In some embodiments, media 300 and chamber 122 are not required, such as when vapor-phase analytes are directly drawn into inlet 140 from the ambient environment. In such embodiments, blocks 902, 904, 906, and 908 may be omitted and the process of FIG. 9 may begin with block 910.

In block 910, pump 144 operates to draw analytes 320 through inlet 140. Also during block 910 and continuing through the process of FIG. 9, inlet heater 120B may operate to maintain analytes 320 received through inlet 140 in a vaporized state as discussed.

In block 912, analytes 320 are received by chemical detector 142 as shown in FIG. 3. Also during block 912 and continuing through the process of FIG. 9, reporter heater 120C may operate to reduce the formation of cold spots and help analytes 320 desorb from chemical reporters 416, 418, and 420 as discussed.

As discussed, by implementing support structure 600 with a carbon filled polymer material, support structure 600 will continue to maintain its shape (e.g., remain entirely in solid form and not deform), even while heaters 120B and 120C are operating and positioned adjacent to and/or received within support structure 600.

In block 914, excitation sources 412/414 provide various types of excitations to generate responses from chemical reporters 416/418 as discussed. Also, in some embodiments, chemical reporter 420 may be implemented without a corresponding excitation source as discussed.

In block 916, chemical reporters 416/418/420 respond to the presence of analytes 320. For example, in some embodiments, military explosives chemical reporter 416 may respond to the portion of analytes 320 corresponding to test samples 301 and 302, nitric acid chemical reporter 418 may respond to the portion of analytes 320 corresponding to test sample 302, and peroxide chemical reporter 420 may respond to the portion of analytes 320 corresponding to test sample 303.

In block 918, responses of the chemical reporters 416/418/420 to the analytes 320 are detected. For example, response detector 422 may detect the response of military explosives chemical reporter 416 to the portion of analytes 320 corresponding to test samples 301 and 302, response detector 424 may detect the response of nitric acid chemical reporter 418 to the portion of analytes 320 corresponding to test sample 302, and response detector 426 may detect the response of peroxide chemical reporter 420 to the portion of analytes 320 corresponding to test sample 303.

In block 920, processor 112 determines whether materials of interest are present based on the responses detected by response detectors 422, 424, and 426. In block 922, the results of block 920 are provided to the user, for example, by messages and/or graphics provided by display 108, audible notifications provided by audio component 132, and/or other techniques as appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A device comprising:
   a flow path comprising an analyte reporter configured to receive samples passed by the flow path;
   a detector configured to receive a response from the analyte reporter to determine whether the samples comprise a material of interest; and
   a support structure defining a cavity configured to position the flow path relative to the detector, wherein the support structure comprises a carbon filled polymer material, wherein the support structure is a single molded structure, wherein the support structure comprises an aperture adjoining the cavity and configured to pass the response from the analyte reporter to the detector.

2. The device of claim 1, wherein the material comprises at least one of carbon filled polytetrafluoroethylene (PTFE), carbon filled cyclic olefin copolymer (COC), or carbon filled cyclic olefin polymer (COP).

3. The device of claim 1, wherein the cavity is configured to receive at least a portion of the flow path therein.

4. The device of claim 1, further comprising a heater configured to heat the samples provided to the flow path, wherein the material is configured to cause the support structure to maintain its shape while the heater operates within in a temperature range of approximately 145 degrees Celsius to approximately 190 degrees Celsius.

5. The device of claim 1, wherein the analyte reporter is responsive to an optical, electrical, or chemical excitation source.

6. The device of claim 1, wherein the response is a change in fluorescence of the analyte reporter in response to the samples.

7. The device of claim 1, wherein the detector is an optical detector.

8. A method of operating the device of claim 1, the method comprising:
receiving the samples in the flow path;
passing the samples through the flow path to the analyte reporter; and
receiving, at the detector, the response from the analyte reporter to determine whether the samples comprise a material of interest.

9. A method comprising:
positioning, by a support structure defining a cavity, a flow path relative to a detector, wherein the support structure comprises a carbon filled polymer material, wherein the support structure is a single molded structure, wherein the support structure comprises an aperture adjoining the cavity;
receiving samples in the flow path;
passing the samples through the flow path to an analyte reporter disposed in the flow path;
passing a response from the analyte reporter to the detector through the aperture; and
receiving, at the detector, the response from the analyte reporter to determine whether the samples comprise a material of interest.

10. The method of claim 9, wherein the material comprises at least one of carbon filled polytetrafluoroethylene (PTFE), carbon filled cyclic olefin copolymer (COC), or carbon filled cyclic olefin polymer (COP).

11. The method of claim 9, wherein the cavity is configured to receive at least a portion of the flow path therein.

12. The method of claim 9, further comprising operating a heater to heat the samples provided to the flow path, wherein the material causes the support structure to maintain its shape while the heater operates within in a temperature range of approximately 145 degrees Celsius to approximately 190 degrees Celsius.

13. The method of claim 9, wherein the response is a change in fluorescence of the analyte reporter in response to the samples.

14. A method comprising:
providing a support structure comprising a carbon filled polymer material, wherein the providing comprises:
molding the material into a single molded structure,
creating a cavity in the single molded structure, and
creating an aperture in the support structure adjoining the cavity to pass the response from the analyte reporter to the detector;
inserting a flow path into the cavity defined by the support structure, wherein the flow path comprises an analyte reporter configured to receive samples passed by the flow path;
positioning, by the support structure, the flow path relative to a detector; and
wherein the detector is configured to receive a response from the analyte reporter to determine whether the samples comprise a material of interest.

15. The method of claim 14, wherein the material comprises at least one of carbon filled polytetrafluoroethylene (PTFE), carbon filled cyclic olefin copolymer (COC), or carbon filled cyclic olefin polymer (COP).

* * * * *